Nov. 15, 1955 J. BAIERLEIN 2,723,523
LAWN MOWER ROLLER
Filed Oct. 19, 1953
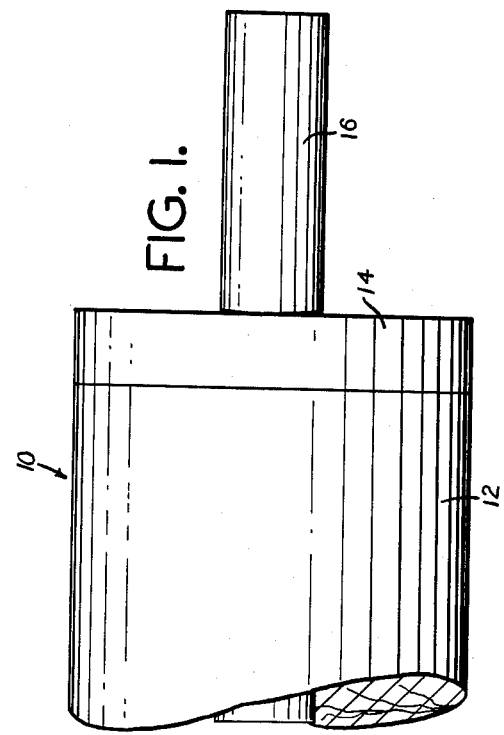
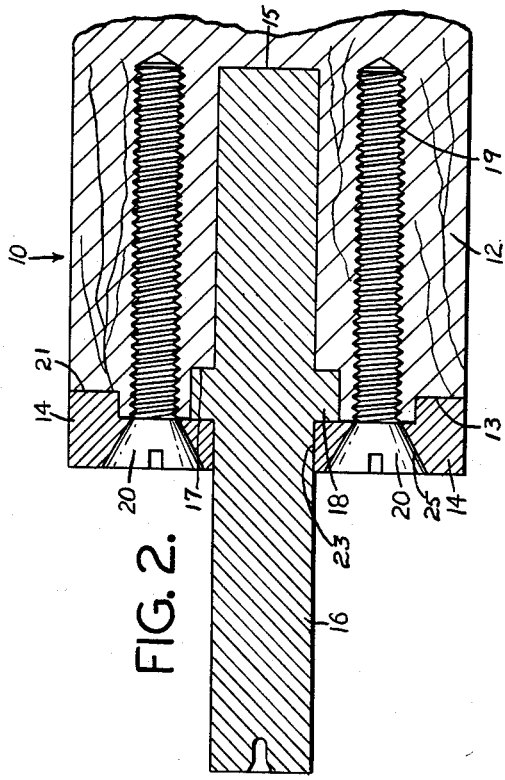
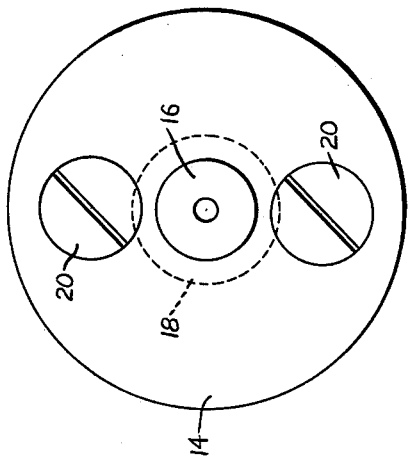
INVENTOR
JOHN BAIERLEIN.
BY
ATTORNEY

United States Patent Office 2,723,523
Patented Nov. 15, 1955

2,723,523

LAWN MOWER ROLLER

John Baierlein, Richmond Hill, N. Y.

Application October 19, 1953, Serial No. 386,759

2 Claims. (Cl. 56—249)

This invention relates to a lawn mower roller.

The principal object of this invention is the provision of a lawn mower roller having reversible, replaceable stud shafts or axles. Each shaft is double-ended and when one end is worn the shaft may be reversed in position to make use of the unused end. This doubles the effective life of each shaft.

Another object of this invention is the provision of a lawn mower roller having accurately centered stud shafts or axles. An important advantage of this feature is the increased accuracy which can be maintained in the trimming of lawns to desired heights.

The invention is illustrated in the accompanying drawing in which:

Fig. 1 is a fragmentary side view of one end of a lawn mower roller made in accordance with this invention.

Fig. 2 is a fragmentary, longitudinal section through the opposite end of said lawn mower roller.

Fig. 3 is an end view of the lawn mower roller shown in Figs. 1 and 2.

It will be understood that both ends of the lawn mower roller 10 shown in the drawing are made identically so that a description of one is a description of both.

The lawn mower roller herein claimed comprises a wood cylinder 12, a pair of steel retaining caps or discs 14, a pair of steel stud shafts, axles or pins 16, and a plurality of screws 20. Each end of the wood cylinder 12 is machined along its peripheral edge to form an annular rabbet 13 and it is also provided with a central, longitudinally extending hole 15 having an enlarged outer end 17. Paralleling longitudinal hole 15 is a pair of tapped holes 19.

It will be observed that shaft 16 is double ended and that intermediate its two ends is an annular shoulder 18 which is concentric therewith. This shoulder is situated midway between the two ends of the shaft so that each end is equally as useful as the opposite end. The diameter of the ends of the shaft corresponds to the diameter of hole 15 and the diameter of annular shoulder or collar 18 corresponds to the diameter of the enlarged portion 17 of said hole 15. Similarly, the length of each end of the shaft combined with the annular shoulder or collar 18 corresponds to the combined length of hole 15 and enlarged portion 17. It will be apparent from the foregoing, that each end of the shaft may be inserted into hole 15 and the shoulder or collar 18 will occupy the enlarged hole portion 17. A snug fit is desired and since hole 15 is centered with respect to the cylinder 12, shaft 16 will similarly be centered.

Retaining cap or disc 14 has an annular shoulder 21 along its peripheral edge and on its inner face. This annular shoulder corresponds in dimensions to the annular rabbet 13 of the cylinder and consequently it is adapted to fit snugly therein when the cap is placed flat against the end of said cylinder. The diameter of the cap corresponds to the diameter of the cylinder as the drawing clearly shows. It will also be observed that a central hole 23 is formed in cap 14, corresponding in diameter to the diameter of the shaft 16. Consequently, the outer end of said shaft is adapted to project through hole 23 when said cap 14 is placed against the end of the cylinder in the manner described. The inner face of said cap 14 will abut the outer face of annular shoulder or collar 18. Counter-sunk holes 25 are formed in cap 14 for registration with the tapped holes 19 in the cylinder. These counter-sunk holes are adapted to receive the conical heads of screws 20 when said screws are screwed into tapped holes 19.

It will be seen from the foregoing, that screws 20 securely hold cap 14 on the end of the cylinder 12. The cap is accurately centered relative to the cylinder by reason of the engagement of its annular shoulder 21 with the annular rabbet 13 of the cylinder. Cap 14 is now adapted to serve as a retaining plate for shaft 16 since it abuts the annular shoulder or collar 18 of said shaft and prevents outward axial displacement thereof. Since hole 15 is centered in the cylinder and since hole 23 is centered in the cap, and since the shaft is snugly contained within both holes, the shaft will be securely supported and accurately centered relative to the cylinder.

Should one end of the shaft become worn, all that need be done is to remove the cap 14 and then reverse the position of the shaft so that its worn end will extend into the cylinder and its unused end will project outwardly therefrom and the cap may then be replaced to securely hold the shaft in place in its reversed position.

I claim:

1. A roller for a lawn mower and the like, comprising a solid wood cylinder, an annular rabbet formed at each end of said cylinder along its peripheral edge, an axial hole formed in the cylinder at each end thereof, centrally of the rabbet, an annular shoulder formed at the open end of each said hole, concentrically therewith and with said rabbet, a shaft mounted in each said hole, said shaft being made of metal and having an annular collar formed thereon, intermediate its ends, said annular shoulder being adapted to receive said collar when the shaft is mounted in said hole, a retaining disc mounted upon each end of said cylinder to hold the shaft in place, said retaining disc having an annular shoulder formed along its peripheral edge for engagement with the annular rabbet in the cylinder, and a plurality of removable screws removably securing said retaining disc to said cylinder, said retaining disc having a centrally disposed hole formed therein through which the outer end of the shaft projects, said retaining disc, in the area immediately surrounding said hole therein, being in abutment with the outer side of the collar on said shaft to hold the shaft in place in its said hole in the cylinder.

2. A roller for a lawn mover and the like, comprising a solid wood cylinder, an annular rabbet formed at each end of said cylinder along its peripheral edge, an axial hole formed in the cylinder at each end thereof, centrally of the rabbet, an annular shoulder formed at the open end of each said hole, concentrically therewith and with said rabbet, a metal shaft removably mounted in each said hole, said shaft having an annular collar former thereon midway between its ends, said annular shoulder being adapted to receive said collar when the shaft is mounted in said hole, said shaft being reversible in that both of its ends on opposite sides of the collar are adapted both for mounting within said hole and for serving as bearings to rotatably support the cylinder, a retaining disc mounted upon each end of said cylinder to hold the shaft in place, said retaining disc being of the same diameter as the cylinder and having an annular shoulder formed along its peripheral edge for engagement with the annular rabbet in the cylinder, and a plurality of removable screws removably securing said retaining disc to said cylinder, said retaining disc having a centrally disposed bore formed therein through which the outer end of the shaft projects and being in abutment with the outer side of the collar on said shaft to hold the shaft in place in its said hole in the cylinder.

References Cited in the file of this patent

UNITED STATES PATENTS

| | | |
|---|---|---|
| 270,834 | O'Neill | Jan. 16, 1883 |
| 1,482,744 | Heffernan | Feb. 5, 1924 |

FOREIGN PATENTS

| | | |
|---|---|---|
| 16,715 | Great Britain | July 22, 1907 |